Oct. 27, 1964     H. R. FRONING ETAL     3,154,383
PROCESS EMPLOYING MOLECULAR SIEVE MATERIAL FOR
THE PRODUCTION OF FREE SULPHUR FROM A FLUID
CONTAINING HYDROGEN SULFIDE
Filed July 24, 1961
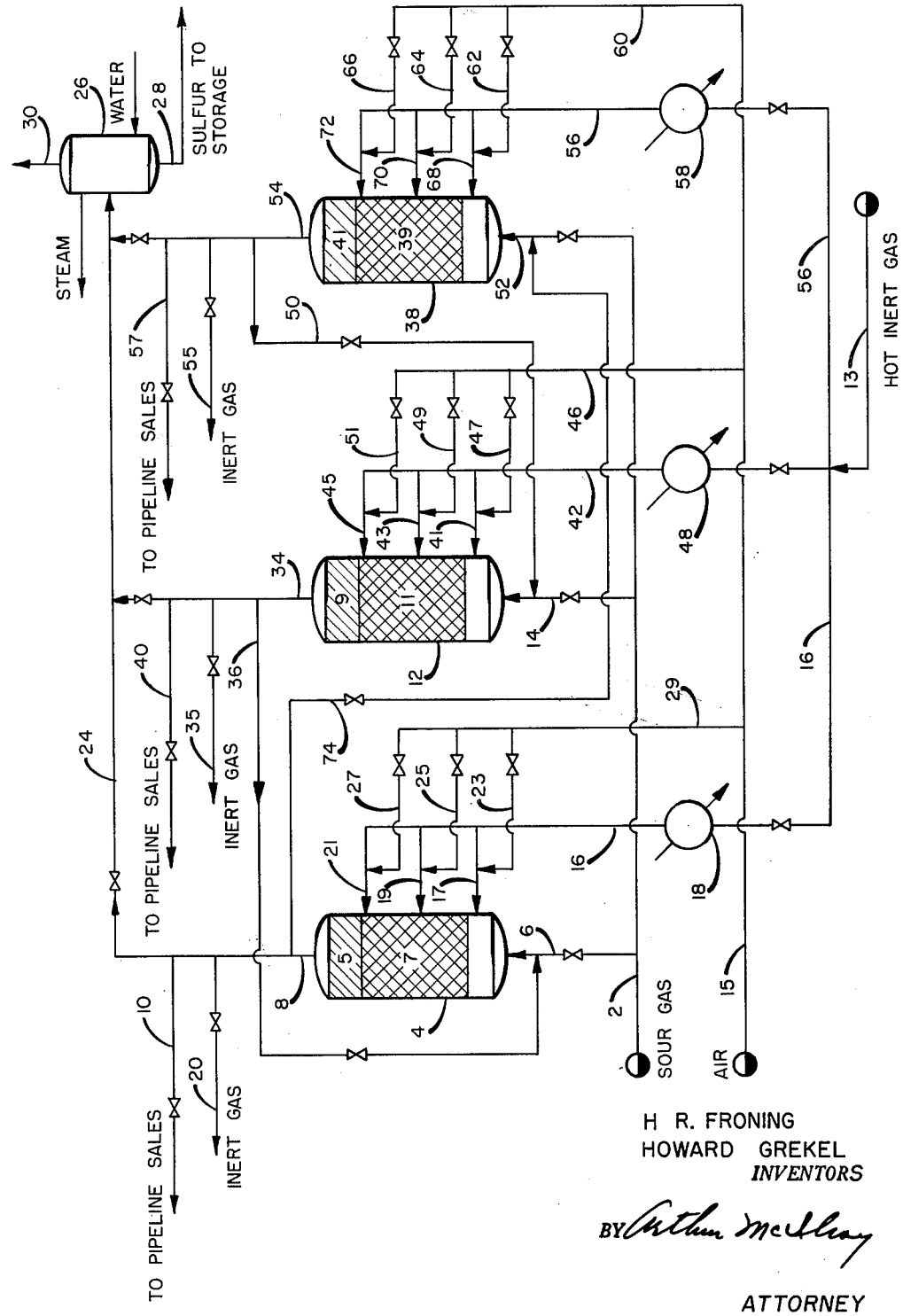
H. R. FRONING
HOWARD GREKEL
*INVENTORS*
BY *Arthur McElroy*
*ATTORNEY*

United States Patent Office 3,154,383
Patented Oct. 27, 1964

3,154,383
PROCESS EMPLOYING MOLECULAR SIEVE MATERIAL FOR THE PRODUCTION OF FREE SULPHUR FROM A FLUID CONTAINING HYDROGEN SULFIDE
H Robert Froning and Howard Grekel, Tulsa, Okla., assignors to Pan American Petroleum Corporation, Tulsa, Okla., a corporation of Delaware
Filed July 24, 1961, Ser. No. 126,023
7 Claims. (Cl. 23—225)

The present invention relates to a novel method for sweetening sour gas streams. More particularly, it is concerned with a method for removing hydrogen sulfide from said streams and converting the hydrogen sulfide thus removed to elemental sulfur.

Briefly, the process of our invention involves introducing a hydrogen sulfide-containing stream into a vessel packed with a suitable $H_2S$ adsorbent. This step is continued until the bottom portion of the bed is substantially saturated with hydrogen sulfide and water. Introduction of sour gas is then discontinued and air is next injected into the bed, whereby the adsorbed hydrogen sulfide is oxidized to free sulfur and water. In this way, not only is free sulfur formed, but the bed is regenerated for the succeeding adsorption step.

In the past, fixed bed units have been employed to dehydrate natural gas and similar streams prior to processing in a natural gasoline plant or introduction into a pipeline. In such a system, two or three individual fixed beds could be used. With two units, the adsorption cycle was carried out for the same length of time as was required to regenerate the second bed and cool it down for the subsequent adsorption step. When using three units, the adsorption, regeneration and cooling phases are carried out for substantially the same period of time. More recently such units have been used to serve the dual purpose of drying the gas and sweetening it at the same time. The hydrogen sulfide thus adsorbed on the material employed in the fixed bed, however, was flared to the atmosphere during the regeneration cycle. While a procedure of this sort would serve to sweeten the gas, over-all it was rather inefficient because no provision was made for the recovery of sulfur.

Accordingly, it is an object of our invention to provide a method whereby a sour gas stream can be both dehydrated and sweetened by the use of a fixed bed unit, and the removed hydrogen sulfide converted into free sulfur. It is a further object of our invention to effect this conversion to free sulfur by the direct partial oxidation of adsorbed hydrogen sulfide and to carry out such conversion during the aforesaid regeneration step.

The process of our invention may be further illustrated by reference to the accompanying drawing in which a sour natural gas containing, for example, 5 mol percent hydrogen sulfide and 0.1 mol percent water, is run into line 2 and into vessel 4 via valve line 6. Vessel 4 contains a fixed bed of a suitable material, such as molecular sieves. These materials are usually calcium or sodium aluminum silicate compounds such as, for example, $Na_2O \cdot 2Al_2O_3 \cdot 5SiO_2$ or $CaO \cdot 2Al_2O_3 \cdot 5SiO_2$. When the sour wet gas flows into the bed of molecular sieves both water and hydrogen sulfide are immediately removed from the stream by adsorption into the sieve material. For most efficient removal of these two substances from the gas stream, relatively low temperatures, e.g., 70° to about 100° F., are desirable. Generally, the bed in the reaction vessels may be considered as divided into two separate sections, a small reaction zone 5, and a larger adsorption zone 7. Reaction zones may contain an adsorbent of the above-mentioned type, or it may be filled entirely with a material which is a catalyst for the oxidation reaction, but which is not necessarily a good adsorbent such as, for example, bauxite. Owing to the rapid rate at which hydrogen sulfide is oxidized to free sulfur and water in the presence of a suitable catalyst, only a relatively small portion of the bed in the vessels need be provided for the reaction zone. As a result, a relatively large section can be used for adsorption, thereby permitting longer on-stream periods.

The length of the adsorption cycle will, of course, depend upon a number of variables such as, for example, the concentration of hydrogen sulfide and water in the gas being treated and the rate at which the gas flows through the bed. Generally, space velocities of from about .015 to about .25 mol of gas per hour per pound of adsorbent material are adequate. When the hydrogen sulfide and/or moisture content of the effluent gas from the adsorption zone in vessel 4 indicates that the saturation of the adsorbent has reached the optimum level, the flow of sour gas to vessel 4 is diverted to vessel 12 by closing valved line 6 and opening valved line 14.

After flow of gas through vessel 4 is discontinued by closing valved line 6, and prior to regeneration of the unit, hot, inert gas from main supply line 13 is directed into open valved line 16 and then into reaction zone 5 via line 21. The gas from an inert gas generator ordinarily is too hot for injection, as produced. Accordingly, the hot gas may be blended with air supplied through lines 29 and 27 to bring the temperature of the gas down to a level of, for example, 400° F. If desired, partial cooling of the gas may be accomplished by use of cooler 18. By bringing the reaction zone to a substantially uniform temperature of from about 375° to about 450° F. prior to the introduction of any hot gas in the adsorption zone 7, hydrogen sulfide subsequently introduced into the reaction zone 5 reacts readily with oxygen to form free sulfur. It is also desirable to preheat reaction zone 5 in the above, or equivalent, manner because sulfur vapors produced in adsorption zone 7, when free oxygen is present in the hot gas introduced into zone 7, would otherwise tend to condense on the surface of the cooler catalyst in reaction zone 5 and eventually plug the unit. In general, the preheat temperature employed should be such that the maximum temperature of the effluent gas does not appreciably exceed about 1000° F., since substantially higher temperatures sometimes adversely affect the adsorbent and/or catalyst. The maximum temperature can be controlled by regulating the rate, temperature and oxygen concentration in the gas streams fed at appropriate points during the regeneration cycle.

While zone 5 is being preheated, the inert gas is taken out of vessel 4 via open line 8 and open-valved line 20, the valves in lines 10 and 24 having been closed. When the reaction zone 5 in vessel 4 has been properly preheated, hot, inert gas from line 16 is introduced into adsorption zone 7 via lines 17 and 19. Cooling of gas flowing into adsorption zone 7 likewise may be effected by use of cooler 18. The gas, however, should be hot enough to produce a substantially uniform temperature in adsorption zone 7 of from about 400° to about 600° F. If air is blended in with said inert gas via lines 23, 25 and 27, care should be taken to see that the temperature throughout the adsorption zone 7 is above the sulfur dew point.

When reaction zone 5 has been heated to the proper temperature, and as soon as hydrogen sulfide from adsorption zone 7 begins to enter zone 5, air is introduced into zone 5 via lines 27 and 21 in an amount sufficient to react with the hydrogen sulfide liberated by the hot, inert gas added to zone 7 through lines 17 and 19. As previously indicated, some air may be injected into zone 7 during the regeneration thereof after the temperature in zone 7 is above the sulfur dew point. Accordingly, the quantity of air added to zone 5 via lines 27 and 21, when combined with that introduced into zone 7, should not be in excess of the stoichiometric amount required to convert the hydrogen sulfide in the system to free sulfur and water. The quantity of oxygen necessary to effect the reaction may be automatically determined and controlled by conventional instrumentation for this purpose.

In providing a gas of suitable composition in reaction zone 5, we gradually increase the temperature of the gas introduced at a level near the bottom of the hydrogen sulfide-containing bed. This gas, at temperatures in excess of about 400° F., liberates hydrogen sulfide from the adsorbent and forces said hydrogen sulfide into preheated reaction zone 5 where oxygen-containing gas is added at the stoichiometric rate and at a temperature of from about 300° to about 500° F. Regulation of temperatures and rates of the gas streams so that the bulk of the conversion of hydrogen sulfide to free sulfur occurs in zone 5, is considered to be an important feature of our invention.

Sulfur and water vapors, plus any unconverted hydrogen sulfide, are transferred through line 8 and open valved line 24 to condenser 26 operated at a temperature of from about 250° to about 320° F. Product sulfur is withdrawn through line 28 and uncondensed gases, including water vapor, are taken from the system via line 30.

When the regeneration cycle is substantially complete, as may be evidenced by a definite drop in temperature in the effluent gas, air injection may be continued until the bed is reduced in temperature to a level of not higher than about 250° to 300° F., at which time valved air line 23 is closed and cool sour gas is again introduced into the regenerated bed via lines 2 and 6. It should be pointed out that the temperature in the freshly regenerated adsorption bed will continue to drop as the flow of sour gas therethrough proceeds. For most efficient adsorption, the bed temperature should be in the neighborhood of from about 60° to about 100° F., which temperature can be reached within a relatively short period after the adsorption cycle begins. Usually, at this point the bed is not more than about one-third saturated with hydrogen sulfide. As an alternate means of cooling the bed down to suitable adsorption temperatures, cool, sweet gas from vessel 12 is taken off through line 34 and routed through open valved line 36, and the gas introduced into vesesl 4 via line 6.

Operation of vessels 12 and 38 through the adsorption, regeneration and cooling cycles is identical with that described in detail in connection with vessel 4. However, in the case of vessel 12, sweetened gas is taken off through line 34, open valved line 40 and from there to pipeline sales. After reaction zone 9 has been preheated by use of hot, inert gas fed to lines 42 and 45 from supply line 13, hot inert gas is injected via lines 41 and 43 at spaced points into adsorbtion zone 11 of vessel 12. The temperature of the hot injected inert gas may be controlled by blending sufficient air from open valved lines 46, 47, and 49 to bring the temperature of said gas down to a level not substantially in excess of 400° F. Likewise, temperature control of said inert gas may be at least in part effected by running hot gas from the generator through cooler 48. Effluent inert gas is vented through lines 34 and 35. Air is then introduced into preheated zone 9 via lines 45 and 51 to react with the hydrogen sulfide coming from zone 11. As previously indicated, a portion of the air used in the regeneration step may be injected into vessel 12 at one or more spaced points along said vessel via lines 47, 49 and 51 to convert hydrogen sulfide into free sulfur. Hot product sulfur vapors and steam are withdrawn via line 34 and introduced into condenser 26 via line 24 where separation of product sulfur from the other components of the mixture introduced into the condenser is effected in the manner previously described.

The cooling of the adsorbent bed in vessel 12 likewise may be effected by continuing the flow of air via lines 41 and 47 until a substantial drop in temperature is observed.

Alternatively, the cooling step may be effected by the introduction of cool, sweet gas from vessel 38, which is on an adsorption cycle, via lines 50 and 14. When air is used as the coolant in this step, it may, if desired, be injected into the bed at spaced intervals via lines 49 and 51 as well as through line 47.

In the case of vessel 38, sour gas in line 2 is supplied via open valved line 52. Adsorption of hydrogen sulfide and moisture is then effected, under conditions identical with those previously described, with the resulting sweetened gas being taken off through open valved line 54 and into the sales pipeline via line 57. After adsorption zone 39 in vessel 38 has become saturated with hydrogen sulfide and water, reaction zone 41 is preheated by the use of hot, inert gas through open valved line 56 which is, in turn, supplied by means of line 13. Again, temperature control of the hot, inert gas thus injected via line 56 is accomplished either by flowing said gas through cooler 58, or by blending air from open valved lines 60, 62, 64 and 66 into lines 68, 70 and 72 in an amount sufficient to reduce the temperature of the inert gas to a level preferably not substantially above 400° F. By injection of the inert gas at these spaced points along the bed, as indicated, the temperature of the adsorbent approaches a uniform value. Effluent inert gas is removed from the system via lines 54 and 55. Simultaneously with regeneration of zone 39 in vessel 38, air in controlled amounts enters preheated reaction zone 41 via lines 66 and 72 to convert liberated hydrogen sulfide, swept from zone 39, into free sulfur as described in connection with operation of the process in vessels 4 and 12. Hot regeneration gases consisting primarily of sulfur vapors, steam, and inert gas are taken off through line 54 and introduced into condenser 26 via line 24.

At the conclusion of the regeneration cycle, the adsorption and reaction zones in vessel 38 may be cooled either by continued introduction of air through line 62 or by introduction of cool, sweet gas from vessel 4 flowing through open valved line 74 and line 52.

While we have directed the application of our invention primarily to gaseous systems, it may be employed with equal efficiency for the removal of hydrogen sulfide from liquids. Other modifications of the process of our invention will be apparent to those skilled in the art without departing from the scope thereof. Thus, while we have shown the reaction and adsorption zones housed in a single vessel, it will be apparent that each of said zones could be in a separate unit without departing from the scope of our invention. Also, if desired, a number of adsorption zones may be used and the effluent therefrom fed into a single reaction zone provided the time cycles during which said adsorption zones are in use are properly controlled. Likewise, a single mixed bed consisting primarily of adsorbent and catalyst may be used in place of employing distinct adsorbent and catalyst beds. It is also within the scope of our invention to operate at pressures in the adsorption zone substantially higher than those in the reaction zone. Thus, in cases where sour gas is coming in at a field pressure of, for example, 1000 p.s.i., the capacity of the unit for hydrogen sulfide is increased materially. When our adsorption zone, operating at such elevated pressures, is brought down to atmospheric pressure, much of the abosrbed hydrogen sulfide is released without the use of heat. It is, of course, desirable to control the concentration of the hydrogen sulfide liberated from the adsorbent so that it does not substantially exceed 5 to 10 mol percent, otherwise temperature regulation of the subsequent oxidation reaction becomes more complicated.

We claim:

1. In a process for the production of free sulfur from hydrogen sufide, the improvement which comprises contacting a fluid containing hydrogen sulfide with a fixed bed of a molecular sieve material at temperatures ranging from about 60° F. to about 300° F., said material being capable of catalyzing the oxidation of hydrogen sulfide to free sulfur, whereby said hydrogen sulfide is removed from said fluid by said material, thereafter injecting a substantially inert gas into said bed having a temperature of from about 400° to about 500° F. at spaced intervals along said bed to produce a substantially uniform temperature therein of from about 375° to about 450° F., introducing an oxygen-containing gas into the upper portion of said bed until substantially complete removal of said hydrogen sulfide from said material has been effected as evidenced by a substantial drop in temperature of the effluent from said bed, said oxygen-containing gas being in an amount sufficient to oxidize said hydrogen sulfide to free sulfur, next cooling the thus regenerated material to a temperature ranging from about 60° F. to about 300° F., and repeating the above cycle.

2. In a process for the production of free sulfur from hydrogen sulfide, the improvement which comprises introducing a fluid containing hydrogen sulfide into a bed of a molecular sieve material capable of catalyzing the oxidation of hydrogen sulfide to free sulfur, said bed being divided into an adsorption zone and a reaction zone, contacting said adsorption zone first with said fluid whereby the hydrogen sulfide present therein is removed therefrom, continuing the introduction of said fluid until said adsorption zone is substantially saturated with respect to hydrogen sulfide, thereafter preheating said reaction zone to a temperature of from about 375° to about 450° F., next heating said adsorption zone in the absence of oxygen to a temperature of from about 400° to about 600° F., forcing the hydrogen sulfide thus liberated into said preheated reaction zone while adding sufficient oxygen to the latter at the interface between said reaction and adsorption zones to convert the hydrogen sulfide therein to free sulfur, removing free sulfur from the system, cooling said adsorption zone to a temperature ranging from about 60° F. to about 300° F., and repeating the above cycle.

3. The process of claim 2 in which said fluid is a gaseous mixture.

4. The process of claim 3 in which said gaseous mixture consists essentially of a hydrogen sulfide-containing stream of normally gaseous hydrocarbons.

5. In a process for the production of free sulfur from hydrogen sulfide, the improvement which comprises introducing a normally gaseous hydrocarbon-containing hydrogen sulfide stream into a vessel containing a bed of a molecular sieve material capable of catalyzing the oxidation of hydrogen sulfide to free sulfur, said bed being divided into an adsorption zone and a reaction zone, contacting said adsorption zone first with said stream, whereby the hydrogen sulfide present therein is removed therefrom, continuing the introduction of said stream until said adsorption zone is substantially saturated with respect to hydrogen sulfide, thereafter preheating said reaction zone by means of hot, inert gas to a temperature of from about 375° to about 450° F., next heating said adsorption zone in the absence of oxygen to a temperature of from about 400° to about 600° F., forcing hydrogen sulfide liberated as a result of heating said adsorption zone into said preheated reaction zone, adding sufficient oxygen to the latter at the interface between said reaction and adsorption zones to convert the hydrogen sulfide therein to free sulfur, removing free sulfur from the system, cooling said adsorption zone to a temperature ranging from about 60° F. to about 300° F., and repeating the above cycle.

6. In a process for the production of free sulfur from hydrogen sulfide, the improvement which comprises introducing a normally gaseous hydrocarbon-containing hydrogen sulfide stream into a vessel containing a bed of a molecular sieve material capable of catalyzing the oxidation of hydrogen sulfide to free sulfur, said bed being divided into an adsorption zone and a reaction zone, contacting said adsorption zone first with said stream, whereby the hydrogen sulfide present in said stream is removed therefrom, continuing the introduction of said stream until said adsorption zone is substantially saturated with respect to hydrogen sulfide, thereafter preheating said reaction zone by means of hot, inert gas to a temperature from about 375° to about 400° F., introducing oxygen-containing gas to said reaction zone while heating said adsorption zone in the absence of oxygen to a temperature of from about 400° to about 600° F., adding oxygen to said adsorption zone after the temperature thereof has reached a level of about 400° F., the amount of oxygen so added being less than that required to convert the hydrogen sulfide present in the system to free sulfur, conducting the resulting mixture of oxygen, hot inert gas, and liberated hydrogen sulfide into said preheated reaction zone, the oxygen added to said reaction zone being in an amount which when combined with that introduced into said adsorption zone corresponds approximately to the total oxygen required to convert said liberated hydrogen sulfide to free sulfur at a reaction zone effluent temperature of from about 375° to about 1000° F., removing the free sulfur thus formed, cooling said adsorption zone to a temperature ranging from about 60° F. to about 300° F., and repeating the above cycle.

7. The process of claim 5 in which the adsorption zone is heated by means of hot inert gas.

References Cited in the file of this patent

UNITED STATES PATENTS

| | | |
|---|---|---|
| 2,834,653 | Fleming et al. | May 13, 1958 |
| 2,882,243 | Milton | Apr. 14, 1959 |
| 2,971,824 | Johnson et al. | Feb. 14, 1961 |

OTHER REFERENCES

Linde article, "Chemical Loaded Molecular Sieves," page 1, Form No. F-1311, published by Linde Co., Div. of Union Carbide Corp., N.Y.